United States Patent
Neuhaus

(10) Patent No.: US 10,831,336 B2
(45) Date of Patent: Nov. 10, 2020

(54) METHOD, DEVICE, AND SYSTEM FOR PROVIDING INDICIA ON A DISPLAY

(71) Applicant: Unify GmbH & Co. KG, Munich (DE)

(72) Inventor: Ralf Neuhaus, Lunen (DE)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 16/507,142

(22) Filed: Jul. 10, 2019

(65) Prior Publication Data

US 2019/0332248 A1 Oct. 31, 2019

Related U.S. Application Data

(63) Continuation of application No. 14/513,428, filed on Oct. 14, 2014, now Pat. No. 10,394,418, which is a continuation of application No. 13/670,634, filed on Nov. 7, 2012, now Pat. No. 8,893,005.

(51) Int. Cl.
*G06F 3/0481* (2013.01)
*G06F 9/451* (2018.01)
*H04M 1/725* (2006.01)

(52) U.S. Cl.
CPC ........ *G06F 3/04817* (2013.01); *G06F 3/0481* (2013.01); *G06F 9/451* (2018.02); *H04M 1/72583* (2013.01)

(58) Field of Classification Search
CPC ..... G06F 3/0481; G06F 3/04817; G06F 9/451
See application file for complete search history.

(56) References Cited

U.S. PATENT DOCUMENTS

| | | |
|---|---|---|
| 6,597,378 B1 | 7/2003 | Shiraishi et al. |
| 7,429,988 B2 | 9/2008 | Gonsalves et al. |
| 7,607,096 B2 | 10/2009 | Oreizy et al. |
| 7,624,356 B1 | 11/2009 | Rockey et al. |
| 7,710,401 B2 | 5/2010 | Nagata |
| 7,743,338 B2 | 6/2010 | Madden |
| 7,743,341 B2 | 6/2010 | Brodersen et al. |
| 7,782,308 B2 | 8/2010 | Shin et al. |
| 7,916,125 B2 | 3/2011 | Shin et al. |
| 7,930,650 B2 | 4/2011 | Brodersen et al. |
| 2003/0020762 A1 | 1/2003 | Budrys et al. |
| 2004/0100479 A1 | 5/2004 | Nakano et al. |

(Continued)

*Primary Examiner* — Maryam M Ipakchi
(74) *Attorney, Agent, or Firm* — Finnegan, Henderson, Farabow, Garrett & Dunner LLP

(57) ABSTRACT

A display of an icon includes creating and displaying an icon that provides indicia regarding information relevant to an application to which the icon is assigned. The indicia provides information to a user and is always in the foreground of a display when the application is running regardless of whether the application is currently actively in use and being interacted with by a user or not. At least one expandable indicia is included within the icon. Input provided by clicking the expandable indicia actuates an expanded window for displaying more detailed information. Indicia is also presentable on the icon to provide real time information to a user who is actively using another application such as whether a connection to a server hosting services for the application is lost. A presence state of the user is displayable via presence indicia located on the icon as well.

19 Claims, 9 Drawing Sheets

(56) References Cited

U.S. PATENT DOCUMENTS

| | | |
|---|---|---|
| 2004/0111332 A1* | 6/2004 | Baar .................. G09G 5/00 |
| | | 705/50 |
| 2006/0150118 A1 | 7/2006 | Chaudhri et al. |
| 2009/0164928 A1 | 6/2009 | Brown et al. |
| 2009/0307615 A1 | 12/2009 | Jalon et al. |
| 2010/0073160 A1 | 3/2010 | Gilmour et al. |
| 2010/0275163 A1 | 10/2010 | Gillespie et al. |
| 2011/0138314 A1 | 6/2011 | Mir et al. |
| 2011/0289433 A1 | 11/2011 | Whalin et al. |
| 2012/0084676 A1 | 4/2012 | de Paz |
| 2012/0089922 A1* | 4/2012 | Kennedy ............ G06F 9/451 |
| | | 715/744 |
| 2012/0124615 A1 | 5/2012 | Lee |
| 2012/0324338 A1* | 12/2012 | Meredith .......... G06F 9/45504 |
| | | 715/234 |
| 2013/0238990 A1 | 9/2013 | Ubillos et al. |

\* cited by examiner

```
┌─────────────────────────────────────────────────────────────┐
│ The terminal device runs a first application associated with the icon and illustrating the │
│ icon on a foreground of the display of the terminal device such that the icon is on the │
│ foreground of the display of the terminal device. │
└─────────────────────────────────────────────────────────────┘
                              ↓
┌─────────────────────────────────────────────────────────────┐
│ The terminal device displays a window on the display associated with at least one second │
│ application unrelated to the first application that is being run by the terminal device and a │
│ user of the terminal device is actively using the second application by providing input to │
│ the terminal device that is associated with the at least one second application such that the │
│ icon is within the foreground of the display of the terminal device. │
└─────────────────────────────────────────────────────────────┘
                              ↓
┌─────────────────────────────────────────────────────────────┐
│ The terminal device receives presence state data from a first server to which the terminal │
│ device is communicatively connected and updating the presence state indicia of the icon in │
│ response to the received presence state data. │
└─────────────────────────────────────────────────────────────┘
                              ↓
┌─────────────────────────────────────────────────────────────┐
│ The terminal device illustrates a portion of the displayed icon folding away from one of the │
│ notification indicia, presence state indicia, and expander indicia upon a determination that │
│ input indicates a pointer is over that indicia to provide a more complete view of that │
│ indicia. │
└─────────────────────────────────────────────────────────────┘
                              ↓
┌─────────────────────────────────────────────────────────────┐
│ The terminal device illustrates the portion of the displayed icon folding over a portion of │
│ the one of the notification indicia, presence state indicia, and expander indicia to partially │
│ cover the more complete view of the indicia upon a determination that the pointer is moved │
│ away from that indicia. │
└─────────────────────────────────────────────────────────────┘
                              ↓
┌─────────────────────────────────────────────────────────────┐
│ The terminal device displays a first expanded window to replace the icon upon receipt of │
│ input via actuation of the expander indicia of the icon. The first expanded window has │
│ presence state indicia, notification indicia, and control indicia illustrated thereon. │
└─────────────────────────────────────────────────────────────┘
                              ↓
┌─────────────────────────────────────────────────────────────┐
│ The terminal device displays a second expanded window adjacent to the first expanded │
│ window or to replace the first expanded window upon a determination that input was │
│ provided to the terminal device via the first expanded window to further expand the first │
│ expanded window or show the second expanded window. The second expanded window │
│ has contact information indicia displayed thereon. │
└─────────────────────────────────────────────────────────────┘
```

FIGURE 8

METHOD, DEVICE, AND SYSTEM FOR PROVIDING INDICIA ON A DISPLAY

CROSS-REFERENCE TO RELATED APPLICATION

This application claims priority to U.S. patent application Ser. No. 14/513,428, which is a continuation of U.S. patent application Ser. No. 13/670,634.

FIELD OF INVENTION

The present invention relates to communication systems, such as communication systems that utilize cellular phones, mobile computer devices, tablets, laptops, or other terminal devices. More particularly, the present invention relates to a system, method and device configured to provide indicia to a use of a device that provide important information and messages to a user of the device via the display of the device in a space efficient manner. In one embodiment of my invention, a dynamic, multifunctional and interactive icon mode is provided for icons of applications running on a computer device such as a terminal device or communication terminal.

BACKGROUND OF THE INVENTION

Applications that run on a computer device such as a desktop computer, laptop computer, tablet computer, smart phone, internet appliance, personal digital assistant, a mobile communication terminal, or other type of communication terminal device are typically presented as a rectangular shaped icon that may include indicia identifying the name of the application. The icon may be present on a desktop of the display of the terminal (e.g. on a taskbar of the display, on a system tray of the display, or on a background wallpaper illustrated by the display.

When one application is running and in use on a terminal device, typically the display of the device only provides a display of the screen defined by that application. For instance, if a word processing application is running and is active such that a user is currently using and typing input for the word processing application, the word processing application may be illustrated on the entire display. New information about another running application that is not currently being actively and directly used by a user is not shown to the user. In some devices, the icon of the running but not currently active application may be configured to flash if visible while the other application is running and actively in use by a user. Alternatively, a device running an application may flash a pop-up menu or pop-up window on its display when new information is available regarding the application even though that application is running in the background while a user of the device is actively and directly using another application on the device.

I have determined that the current display of running applications typically utilized in terminal devices fails to permit an icon of a running application that is not in active and direct use by a user, who is actively using another application, to be always visible, utilize a small amount of space such as the space of a typical icon shown to a user, provide direct access to news for the user and provide direct access to important features provided by the application. I have determined that a new method and apparatus are needed to improve the display of important information concerning communication sessions such as possible communication sessions, attempts of initiating a communication session, scheduling of a communication session and availability for a communication session to a user in a space efficient manner.

SUMMARY OF THE INVENTION

A method of displaying visual data on a display of a terminal device and a communication system is provided. One embodiment of the method includes the steps of a terminal device displaying an icon having at least one of an expander indicia, a notification indicia, and a presence state indicia illustrated thereon on a display of the terminal device. The terminal device runs a first application associated with the icon and illustrates the icon on a foreground of the display of the terminal device so that the icon is on the foreground of the display of the terminal device. The terminal device displays a window on the display associated with at least one second application that is unrelated to the first application that is run by the terminal device and a user of the terminal device is actively using by providing input to the terminal device that is associated with the at least one second application so that the icon is within the foreground of the display of the terminal device. The terminal device also receives presence state data from a first server to which the terminal device is communicatively connected and updates the presence state indicia of the icon in response to the received presence state data.

Other embodiments of the method may also include the steps of the terminal device displaying an icon having expander indicia, notification indicia and presence state indicia illustrated thereon on a display of the device, the terminal device illustrating a portion of the displayed icon folding away from one of the notification indicia, presence state indicia, and expander indicia upon a determination that input indicates a pointer is over that indicia to provide a more complete view of that indicia, and the terminal device illustrating a portion of the displayed icon folding over a portion of the one of the notification indicia, presence state indicia, and expander indicia to partially cover that indicia upon a determination that the pointer is moved away from that indicia.

In some embodiments of the method, the terminal device displays a first expanded window to replace the icon upon receipt of input via actuation of the expander indicia of the icon. The first expanded window has presence state indicia, notification indicia, and control indicia illustrated thereon. The terminal device may then display a second expanded window adjacent to or as a replacement for the first expanded window upon a determination that input was provide to the terminal device via the first expanded window to replace the first expanded window or further expand the first expanded window by illustrating the second expanded window. The second expanded window has contact information indicia displayed thereon and may also include presence state indicia, notification indicia, and control indicia in the even the second expanded window is to replace the first expanded window instead of being placed near or in juxtaposition with the first expanded window.

The terminal device may receive multiple communication session related messages from a second server or from the first server. The terminal device may display a notification indicia to indicate information about these communication session related messages such as providing a notification of unanswered calls, new and unread emails, new and unread chat messages or newly received and unheard voicemails.

In one embodiment of the method, the presence state indicia is a graphical representation of a presence state that corresponds with a predefined presence state. The graphical representation corresponds with the presence state identified by the first server in the presence state data received from the first server.

A communication system is also provided. The communication system may be configured to utilize an embodiment of our method. In one embodiment, the communication system includes a first server and a first terminal device that is communicatively connected to the server. The first terminal device displays an icon having at least one of expander indicia, notification indicia and presence state indicia illustrated thereon on a display of the first terminal device. The first terminal device runs a first application associated with the icon and illustrates the icon on a foreground of the display of the first terminal device such that the icon is on the foreground of the display of the first terminal device. The first terminal device displays a window on the display associated with at least one second application unrelated to the first application that is being run by the first terminal device and a user of the first terminal device is actively using the second application by providing input to the first terminal device that is associated with the at least one second application such that the icon is within the foreground of the display of the first terminal device. The first terminal device receives presence state data from the first server and updates the presence state indicia of the icon in response to the received presence state data.

For some embodiments of the system, the icon also has at least one function indicia. Each of the function indicia is associated with a respective function of the first terminal device defined by the first application that is actuatable via user input provided to actuate that function indicia. The first terminal device displays communication session advisory indicia adjacent the first icon in response to receiving data for establishing a communication session with a second terminal device received from a second server. The communication session advisory indicia comprises information relating to the communication session. The first terminal device displays actuatable feature indicia adjacent the communication session advisory indicia upon a determination that a pointer is positioned on the display over the communication session advisory indicia. The actuatable feature indicia is actuatable to actuate a feature of the first terminal device for communicating with the user associated with the second terminal device to establish the communication session with that user. The first terminal device can determine a communication error occurred between the first terminal device and one of the first server and the second server to which the first terminal device communicates when running the first application. The first terminal device displays the notification indicia on the icon upon determining that the communication error occurred to provide indicia indicating that the communication error occurred. The first terminal device determines the communication error was resolved and the first terminal device subsequently removes the displayed notification indicia from the icon. The first terminal device determines that one of the function indicia is actuated via input provided to the first terminal device and the first terminal device performs one of initiating a phone call, initiating an email, and initiating a text message in response to the received input that actuated the one of the function indicia.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

FIG. 8 is a flow chart illustrating an exemplary method of providing indicia that provides information for at least one application running on a terminal device.

DETAILED DESCRIPTION OF PRESENT PREFERRED EMBODIMENTS

Figure 1:
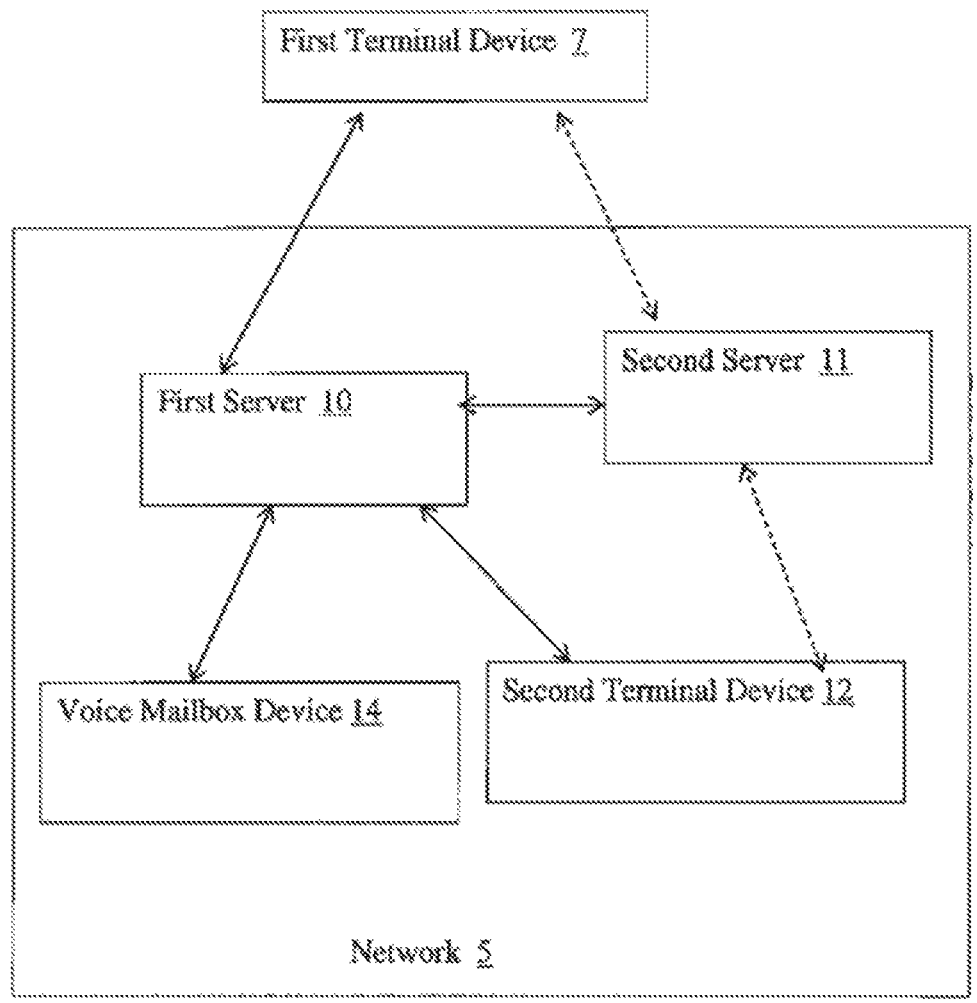
FIG. 1 is a block diagram of an exemplary embodiment of a communication system.
Figure 2:
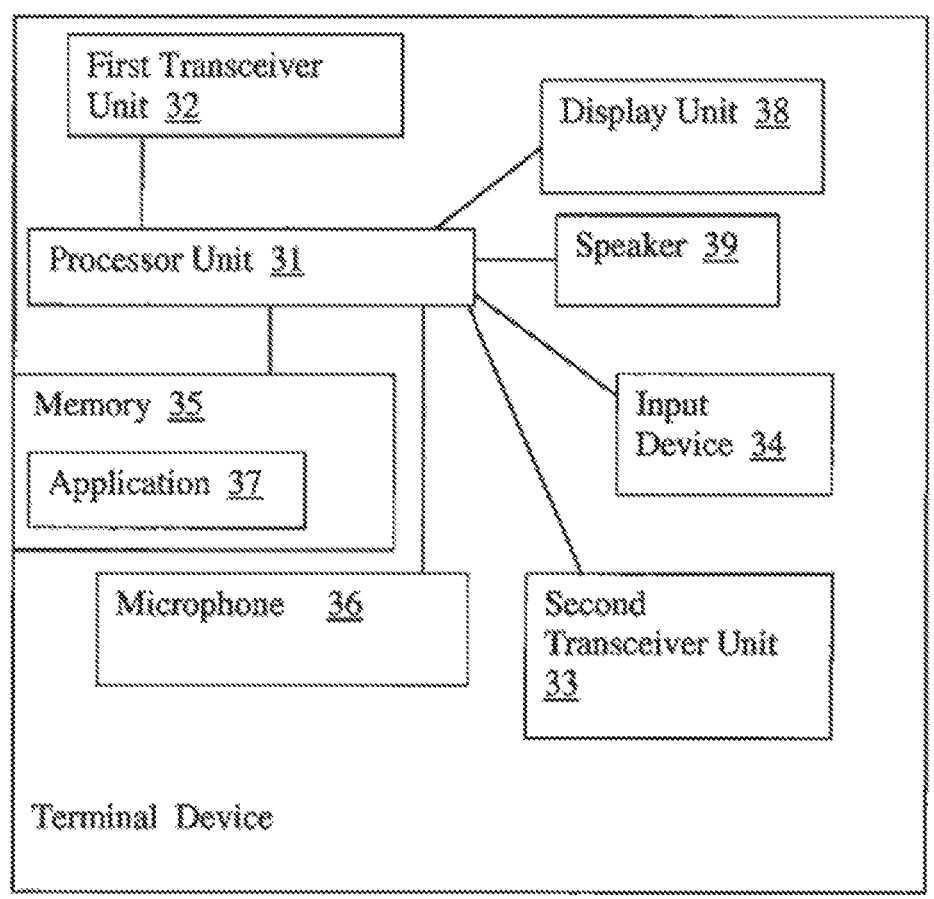
FIG. 2 is a block diagram of an exemplary embodiment of a communication terminal. It should be understood that the diagram of FIG. 2 may provide an exemplary illustration of each of the first terminal device and second terminal device of the communication system shown in FIG. 1.

Referring to FIGS. 1-8, a communication system includes a first terminal device 7 and a second terminal device 12 that are communicatively connected to a first server 10. A voice mailbox device 14 may also be communicatively connected to the first and second terminal devices 7, 12, via a communication connection with the first server 10. Alternatively, the first server may provide voice mailbox functionality as well as host other services. In some embodiments of the system, one or more other servers such as second server 11 will be communicatively connectable to the first server 10 to assist the first server 10 in providing services to the terminal devices connected to the first server 10 or will communicate to the terminal devices via a communication connection with the first server 10.

The terminal devices and first and second server and voice mailbox device may all be elements of a network 5 such as a large area network or enterprise network. Access points (not shown) such as wireless access point, base stations, or routers, and other network nodes may also be included in the network. The communication terminal devices such as the first and second terminal devices 7, 12 may be communicatively connectable to the servers and other network elements via access points to which they are connected or assigned. It should be appreciated that communication connections between different network elements may include a path of communication that traverses an access point (not shown) as well as other network nodes to define the communication path. For example, in some embodiments it is contemplated that the first terminal device 7 will be communicatively connected to an access point to provide a network connection for the first terminal device 7 so the first terminal device 7 can communicate with the network 5, nodes of the network 5 such as the first and second servers 10, 11, and other terminal devices connected to the network 5. In some embodiments, the first terminal device 7 and second terminal device 12 as well as other communication terminals may have separate communication connections with the first server 10 and the at least one second server 11 that may each host other services renders to those terminal devices. Such optional communication connections are shown in broken line in FIG. 1.

The first terminal device 7 and second terminal device 12 may each be a tablet, a mobile cellular phone, an internet appliance, a laptop computer, a smart phone, a personal digital assistant, a mobile computer device, or other communication terminal. As may be appreciated from FIG. 2, the first and second terminal devices may each include a processor unit 31 that is communicatively connected to a first transceiver unit 32, a second transceiver unit 33, at least one input device 34, memory 35, a microphone 36, a display unit 38 and a speaker 39. The first transceiver unit 32 may include a receiver unit and a transmitter unit for transmission and reception of data via a cellular network, a wireless network connection, or other network connection. The second transceiver unit 32 may be configured to form a wireless connection via a near field communication, a Bluetooth compliant communication, or other type of wireless communication mechanism or permit a wired connection such as a wired connection made via a universal serial bus connection, for example. In some embodiments, the terminal device may include additional transceiver units as well.

The processor unit 31 may be a central processing unit such as a microprocessor, interconnected microprocessors, or other hardware processor element. The memory 35 may be a non-transitory computer readable medium that has at least one application 37 stored thereon that defines a method that is performed by the terminal device, such as for example the method shown in FIG. 8. The memory 35 may include a hard drive, a flash drive, an optical disk or a hard disk or other type of computer readable medium that can stores data for a non-transitory period of time. The speaker 39 may emit audio and the microphone 36 may be an input device that records audio emitted by a user for receiving that audio data. The display unit 38 may be a liquid crystal display or other display device. The display unit 38 may be configured as a touch screen display that functions to output data visually while also permitting a user to provide input by touching different portions of the display. The input device 34 may be a button, keyboard, mouse, or other type of input device a user may utilize to provide input to the device.

It should be understood that the first and second servers may each be a computer device such as a workstation computer or other type of computer device that hosts one or more services to terminal devices communicatively connected thereto. For instance, the first server 10 may oversee, manage, or monitor communication services such as voice communication sessions, instant message sessions, and email communications, and the second server 11 may be responsible for hosting presence services that identify and communicate active presences of users registered with the second server 11. In one embodiment, the second server 11 may provide the current presence state of users of different terminal devices so that the first server 10 can provide presence states for those users to the terminal devices for communicating those presence states to the users of those devices and other users of other devices that are registered with the second server 11. It should be appreciated that any particular user may be registered with the second server and be associated with multiple different terminal devices such as, for example, a user that is associated with a cellular phone, a desktop computer and a laptop computer that the user may use when working as an employee for a business that oversees and controls the network 5.

Figure 3:
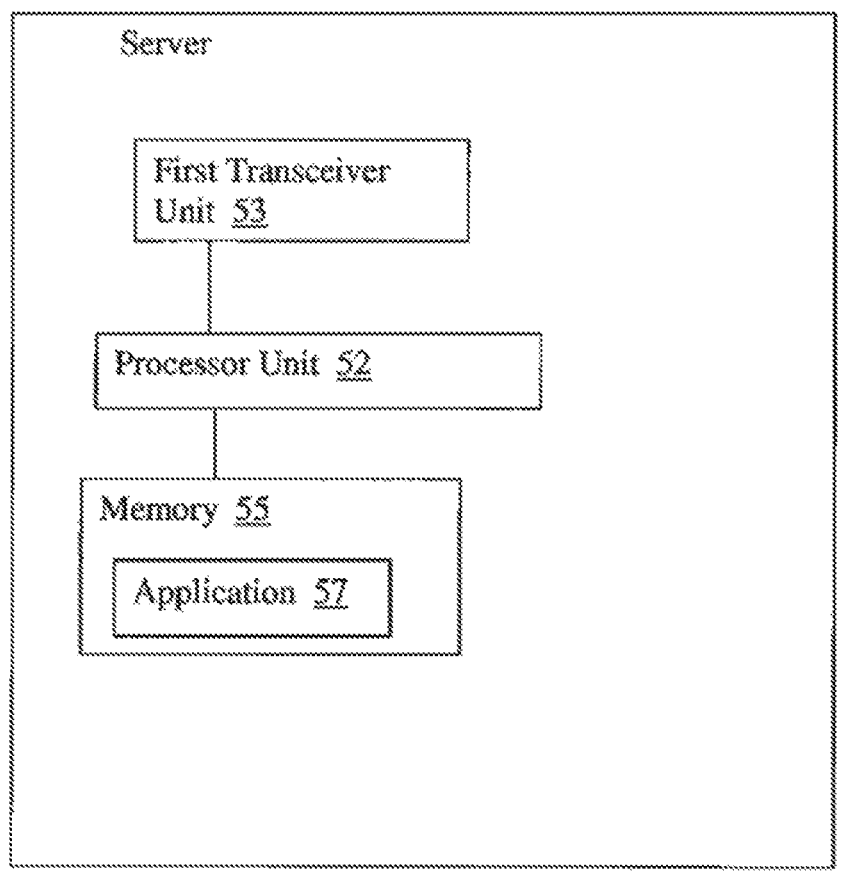
FIG. 3 is a block diagram of an exemplary embodiment of a server. It should be understood that the diagram of FIG. 3 may provide an exemplary illustration of each of the first server and second server of the communication system shown in FIG. 1.
Figure 4:
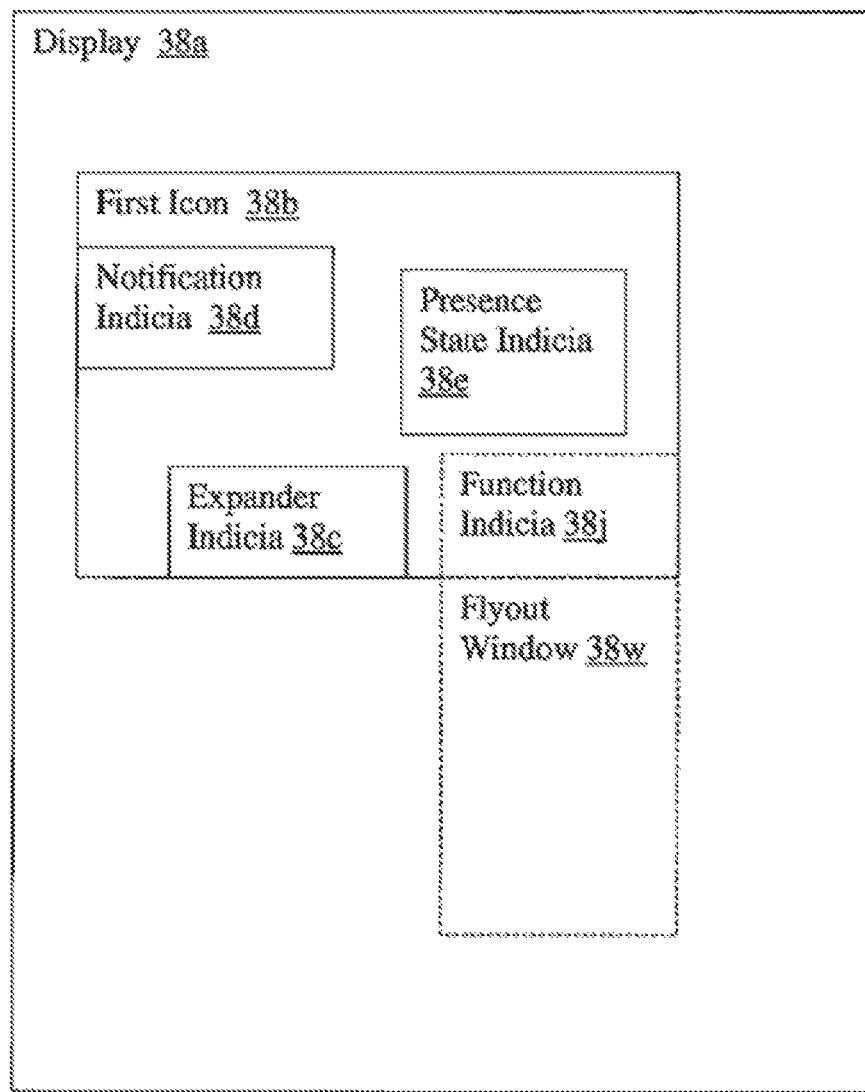
FIG. 4 is a block diagram of an exemplary embodiment of a display that includes an icon for an exemplary embodiment of an application run on the first terminal device. Optional functional indicia 38*j* and an actuatable flyout window 38*w* that is displayable adjacent the icon when the functional indicia is actuated is illustrated in broken line in FIG. 4.
Figure 5:
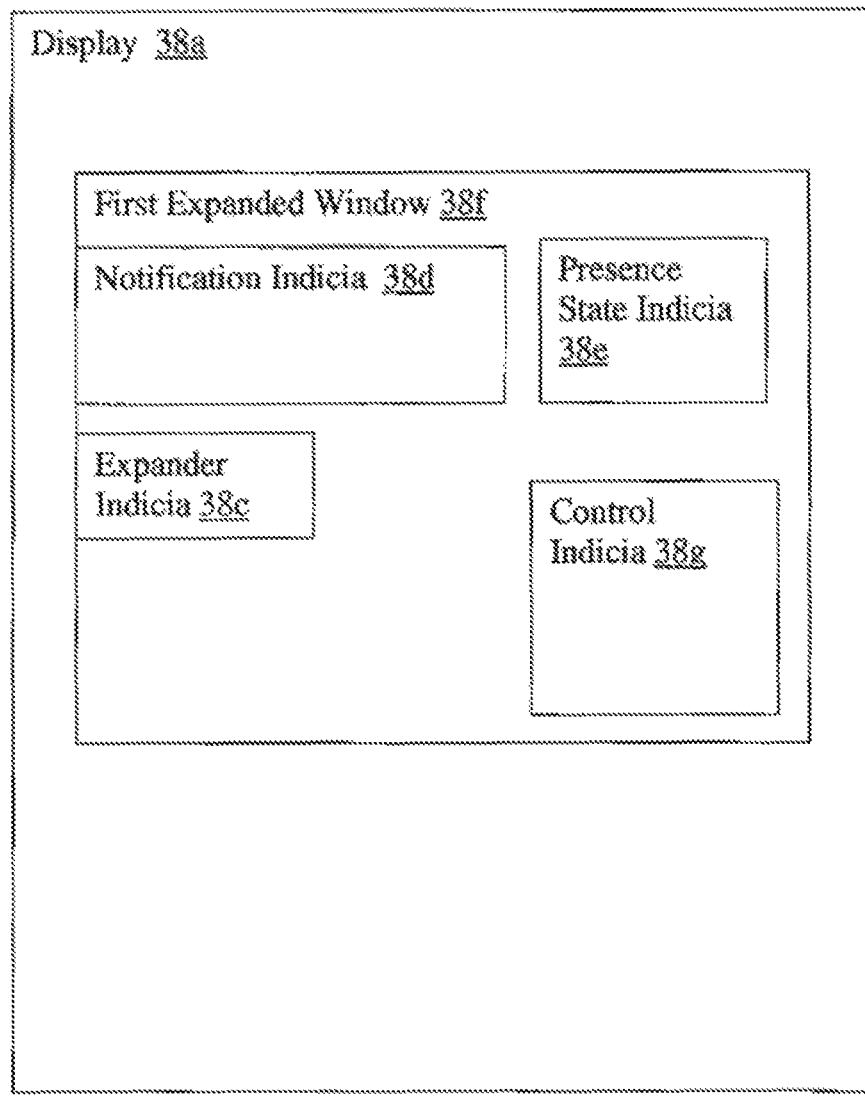
FIG. 5 is a block diagram of an exemplary embodiment of a display that includes an a first expanded window that is actuatable from input provided via the icon shown in FIG. 4 for the exemplary embodiment of the application run on the first terminal device.
Figure 6:
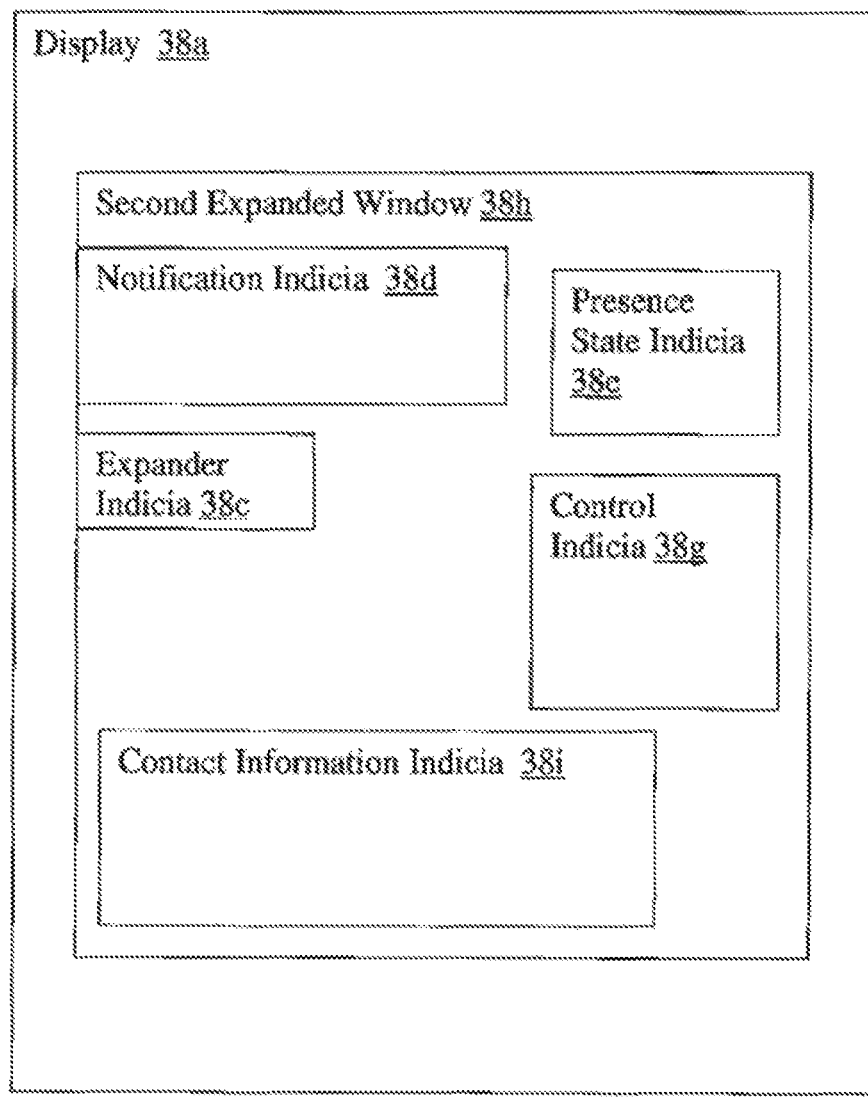
FIG. 6 is a block diagram of an exemplary embodiment of a display that includes a second expanded window that is actuatable from input provided via the first expanded window shown in FIG. 5 for the exemplary embodiment of the application run on the first terminal device.
Figure 7:
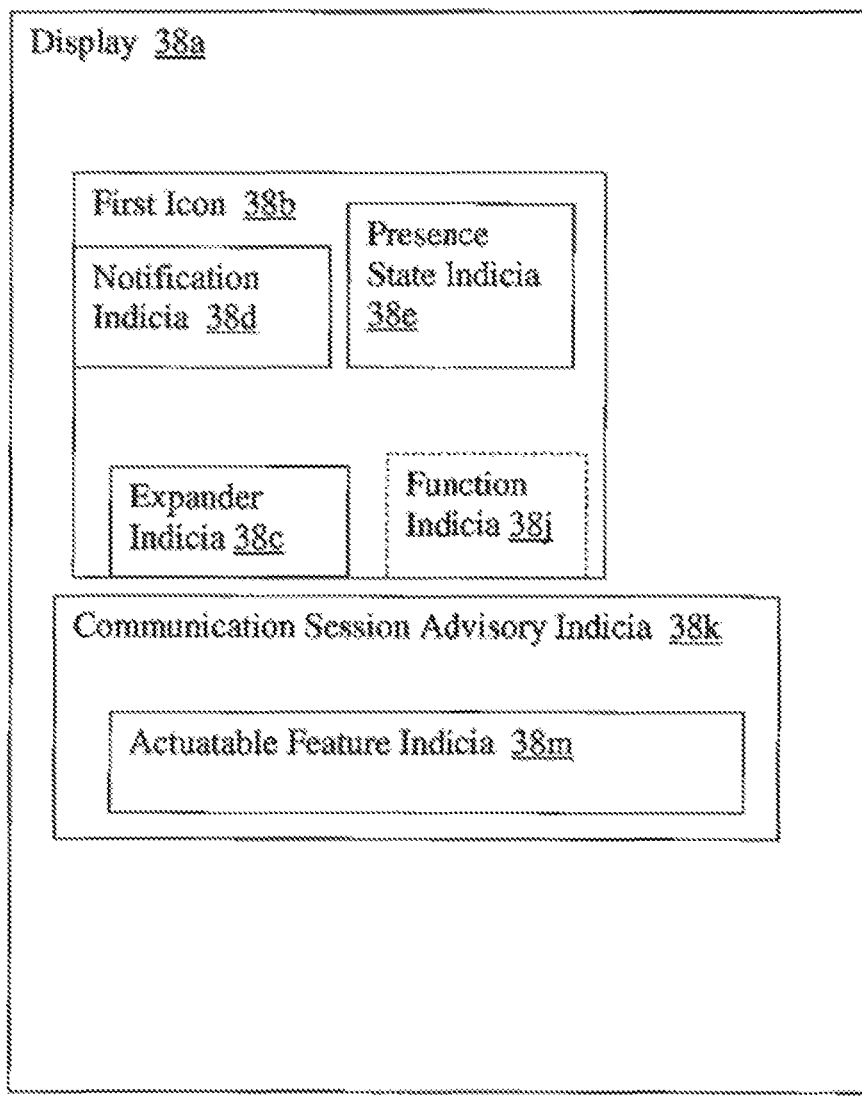
FIG. 7 is a block diagram of an exemplary embodiment of a display that includes indicia indicating a communication session request is received.

As may be seen in FIG. 3, the first server 10 and second server 11 may each include a first transceiver unit 53 that is communicatively connected to a processor unit 52. The processor unit 52 may also be connected to memory, such as non-transitory memory. The memory 55 may have at least one application 57 stored thereon that includes program code that defines instructions that define a method that the server performs when the processor unit 52 executes the application 57. It should be understood that the memory 55 may also include one or more data sets such as databases or other data that contains information that may be accessed to monitor communication sessions of different users, monitor presence states of different users, route calls, redirect communications, or provide other services hosted by the first server 10 or second server 11. The first transceiver unit 53 may be configured to permit communications to be established between the server and multiple communication terminal devices so that one or more communication sessions may be monitored or may be established, maintained and monitored in response to a request to call or otherwise form a communication session with another device that is received by the first server 10. For instance, if the server is a presence server such as the second server 11 in some exemplary embodiments of the system, the first transceiver unit may permit the server to monitor activities of a user on his or her devices that are registered with the server to identify a current presence state of that user.

As another example, if the server may function as the first server 10 in some embodiments of the system and monitor communication sessions of a user. The server for such embodiments may communicate with the different terminal devices to monitor ongoing and attempted communication session related activities to record information about those activities and provide real time information about those activities. In some embodiments, the server may also function as a switch device, softswitch or private branch exchange and provide communication session establishment and maintenance services. In other embodiments, the server may communicate with such a switch device to monitor such communication sessions.

The first terminal device may be configured to have a display unit 38 emit or output a display 38a. The display 38a may include a background image or wallpaper in one mode that also includes a plurality of icons provided thereon. A user may utilize a mouse, stylus, or a finger on a touch screen display to actuate an icon to open the application assigned to the icon for activating or initiating the running of that application. Thereafter, a user may interact with the active application running on the device.

Figure 9:
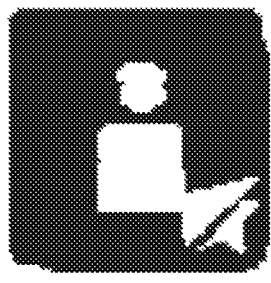
FIG. 9 is a schematic view of an exemplary embodiment of a displayed icon having a portion of the icon being illustrated as folded over to partially cover indicia shown on the icon.
Figure 10:
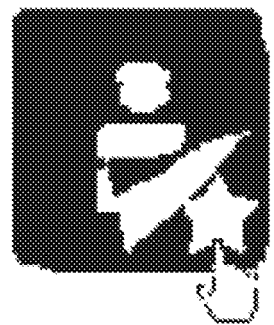
FIG. 10 is a schematic view of an exemplary embodiment of a displayed icon shown in FIG. 9 having a portion of the icon illustrated as being folded away from the indicia partially shown in the icon of FIG. 9 to more completely illustrate the indicia shown on the icon that was partially covered in FIG. 9.

The display 38a may illustrate a first icon 38b that includes one or more notification indicia 38b, an expander indicia 38c that is actuatable for expanding the icon so that a first expanded window 38f is shown instead of the first icon 38b and a present state indicia 38e, which may provide indicia indicating the current presence state of the user of the terminal device that is communicated to other terminal devices via a presence service. The expander indicia 38c may be a star shape shown in a lower corner of a rectangular shaped icon that is illustrated as partially covered until a mouse or finger is positioned over that covered indicia as may be appreciated from the exemplary illustrations provided in FIGS. 9-10. After the pointer, stylus or finger is positioned over the covered indicia, the icon may display a folding away of a covering portion of the icon to provide a full image of the star shape indicia used for the expander indicia 38c. If a mouse pointer or other pointer is moved away from the indicia, the first icon may display a portion of the folded away icon folding back over the expander indicia 38c to partially cover that indicia. Such actuation and display of a folding away effect and a folding over effect may be provided for other indicia that is shown on the first icon 38b as well such as, for example, at least one function indicia 38j.

The expander indicia 38c may be actuatable so that after a click on the expander indicia 38c that can occur from a mouse pointer highlighting or pointing to the expander indicia 38c and a user providing input to activate that indicia, or a user pressing his or her finger on the area of the display 38a over the image of the indicia, a first expanded window 38f is shown on the display 38a and replaces the first icon 38b.

The presence state indicia 38e may be a graphical image or other graphical representation representing one of a number of representations selected from the group consisting of ▪ ▪▪ ☼ ✈ ⇆ ✚ ● ◯ and other types of representational indicia. Each representational indicia type may indicate a different presence state according to a predefined presence state definition. For instance, a representation of a building may indicate the user is working from home, a representation of a person with a diagonal line may indicate a user is currently traveling, and a representation of one person or two persons may indicate the user is in a type of communication session such as a telephone call or conference call. The presence state may be determined by the first server 10 or may be a presence state based on presence status information the first server 10 obtains from a presence server such as the second server 11 via communications exchanged between the first and second servers 10, 11. The different presence status may be any of a number of predefined statuses such as in a meeting, on vacation, out of the office, at home, sick, break, or traveling.

Notification indicia 38d may also be shown. For instance, the notification indicia 38d may be shown in an upper corner of the first icon 38b adjacent to a central presence state indicia 38e and above and to one side of the expander indicia 38c. The notification indicia 38d can be a graphic such as one type of image selected from a group of predefined images to identify a current state of the running application or information that is significant to the running of the application. For instance, the notification indicia 38d may not be present if the application is running and the first terminal device 7 has no communication problems or service problems with the first server 10. If an issue arises, such as a communication failure with the first server 10 or a failure to obtain update presence status information from the first or second server 10 or 11, the notification indicia 38d may be shown. There may be a different graphical image depending on the error that is defined to correspond with a predefine error. For instance, a lightning bolt could be illustrated to represent a communication failure with the first server 10.

If the expander indicia 38c shown on the first icon 38b is actuated, the first expanded window 38f may be shown and may replace the illustrated first icon 38b on the display 38a. The first expanded window 38f may show notification indicia 38d, presence state indicia 38e and expander indicia 38c. The expander indicia 38c shown in the first expanded window 38f may be a similar image or the same image as compared to what is shown on the first icon 38b or a new image. The notification indicia 38d may be a new image or the same image and the presence state image may be the same image as shown on the first icon at the time the opening of the first expanded window 38f was actuated. Of course, if the presence state or notification indicia needs changed due to a new occurrence, the image may be updated to accurately reflect the newly obtained information about that information. The images for the notification indicia, presence state indicia and expander indicia 38d, 38e, and 38c may be shown in different locations and have a different relative size than as that shown in the first icon 38b.

The first expanded window 38f is larger in surface area on the display 38a than the first icon 38b. The first expanded window 38f may also include a plurality of control indicia 38g that may include illustrated buttons or other indicia that provide a control function or otherwise actuate a feature provided by the application being run by the terminal device. For instance, the control indicia 38g may include a button representing a voice mail message feature that causes the terminal device to connect to the mailbox device assigned to the user upon that button being actuated via entered input so that a user can access his or her voice mail message if actuated. Different control indicia may be shown that provides for different features. For instance, indicia may represent a button for actuating a phone call, a different button may be illustrated that is actuatable for initiating an instant message session or for drafting a short message service message (e.g. a text message), another button may be displayed that permits a search of emails to occur, yet another message may provide access to the user's emails. A button for options that may be changed by a user or an icon representing an address book of the user or a calendar of the user may also be illustrated within the control indicia 38g.

Expander indicia 38c may also be shown as a button instead of an expandable star or other shape as shown on the first icon 38b. The expander indicia 38c of the first expanded window 38f may be actuated to cause a second expanded window 38h to be illustrated to replace or supplement the first expanded window 38f upon the entering of use input that actuates the expander indicia (e.g. a pointer is positioned on the expander indicia and input is provided to the terminal device to actuate that indicia or a user presses the touch screen display to actuate that indicia). The second expanded window 38*h* may include the first expanded window and also include a supplemental expansion of that window that is located below the first expanded window 38*f* and includes different information such as contact information indicia 38*i* or other information. The contact information indicia 38*i* may include contact information of different other users in the address book associated with the user of the terminal device or may include information or indicia that is actuatable to initiate a communication session with such persons. For instance, indicia that is actuatable to call or initiate an email or initiate an instant message session or to initiate the sending of a text message to another person or another device associated with that person may be shown within the contact information indicia 38*i*.

Alternatively, the second expanded window 38*h* may replace the first expanded window with a larger window graphic and include the above noted indicia as well as other indicia.

A user may actuate indicia to close the second expanded window 38*h* so that the first icon 38*b* replaces the second expanded window. The first expanded window 38*f* may also include such actuatable indicia. Additionally, the actuation of the expander indicia 38*c* may be configured to permit a closing of the supplemental portion of the second expanded window so that only the first expanded window is present. In some embodiments, the first expanded window 38*f* and second expanded window 38*h* may also be closed such that the first icon 38*b* replaces that open expanded window upon a predetermined amount of time passing without a user providing input to the terminal device that requires actuation of any indicia of the application or other feature of the application. After the predetermined amount of time elapses, the first icon 38*b* may be shown and the first or second expanded window may be removed from the display 38*a*.

It should be understood that the size and shape of the first icon 38*b* is smaller than the first expanded window 38*f*. Additionally, the size and shape of the first expanded window 38*f* is smaller than the size and shape of the new second expanded window 38*h* or the view of the first and second expanded windows being shown at the same time (e.g. the second expanded window is located below the first expanded window to provide a unitary second expanded window).

In some embodiments, the first icon 38*b* may also include at least one function indicia 38*j* that is highlightable or actuatable to provide a supplemental larger display view of a particular function provided by the application to which the first icon 38*b* is assigned. For instance, the function indicia 38*j* may be associated with contact information such as most recently contacted users or people predefined as being preferred contact people for the user of the terminal device. If a finger is pressed on the function indicia 38*j* or the function indicia 38*j* is otherwise actuated, a larger flyout window 38*w* may be displayed for a predetermined amount of time that illustrates certain information about those persons and is actuatable to initiate a communication session to a device associated with that person. Indicia identifying the different personnel may be or include a graphic identifying the last known presence state of that person via predefined presence state graphics. More detailed information about a particular person may be obtained via actuation of the indicia for that person (e.g. a pressing of a portion of the display illustrating that indicia or a pointer being moved to that indicia and subsequently entering input such as a mouse click to actuate that indicia or a mouse over of that indicia such that a point merely has to be located over the indicia to provide the actuation of the indicia). The more detailed information may be illustrated on the display 38*a* via a flyout window 38*w* or flyout display as soon as the indicia is actuated.

It should be understood that the first icon 38*b* is configured to permit easy access to the running application assigned to that icon without having to utilize a full opening of a large window for the application or requiring the full application to be loaded and executed by the processor. Further, the first icon 38*b* may be configured so it is always displayed in the foreground of the display 38*a* regardless of any other applications that may be actively running or being currently actively used and interacted with by a user so that the user is constantly apprised of information relevant to the service offered by the application such as events related to efforts to attempt to communicate with that user. The first icon 38*b* may be sized to provide such information to the user in a way that provides a summary of important information without detrimentally distracting the user from utilizing other applications being run on the user's terminal device.

If the terminal device receives a communication session request from the first server 10 that was initiated by the second terminal device 12, a communication session advisory indicia 38*k* may be displayed. Such indicia may be shown as a flyout window or image adjacent the first icon. The communication session advisory indicia 38*k* may include indicia providing the name of the person that submitted the request for a communication session and the address of the device that person is using to make that request. For instance, a name of a person and the phone number of the device that person is using to make a call for establishing a voice call or a video call with the user of the first terminal device 7 may be shown. Additionally, indicia that is actuatable for answering the call or providing some other exchange of information with the person or the device that person is using to make the communication session request may also be displayed. For instance, a button for accepting the voice or video call and buttons for sending the caller an email, a text message, or an instant message may be displayed as communication session advisory indicia 38*k*. A button may also be displayed that is actuatable for creating and saving a text file that memorializes some information about the communication session request or, if accepted, the communication session held upon accepting that request.

The communication session advisory indicia 38*k* may only display actuatable feature indicia 38*m* such as the email, text messaging or memorandum making actuatable buttons upon a user causing a pointer to be positioned over the indicia of the name of the person or address of the device that initiated the communication session request. Additionally, a call placed on hold while another ongoing communication session is occurring or in progress (e.g. voice call, video call, instant message chat session, etc.) may be indicated in the communication session advisory indicia 38*k*.

The communication session advisory indicia 38*k* may also include indicia that provides information relating to different communication session requests that were transmitted to the terminal device or that were directed to the user. For instance, a circular graphic with a number within that graphic may be illustrated on the first icon 38*b* to indicate there were unanswered communication session requests such as phone calls or chat session requests sent to the user or the terminal device. This graphical indicia may also indicate that voice mails are available for the user. Alternatively, separate graphical indicia may be included on the first icon to represent that voice mails are available for download or accessing by the user of the terminal device. A user may actuate that graphical indicia to cause the terminal device to illustrate a tooltip, which may be a flyout window 38w adjacent the first icon 38b that provides indicia regarding missed calls, new voice messages, new emails, or new text messages. A user may then actuate the indicia representing the missed or unread communication messages to play a voice message, initiate a phone call to return a missed call, or cause the display 38a to illustrate a received email or chat message.

The first icon or expandable windows may be moveable about any portion of a display. A user may use a mouse to provide input for moving the icon or windows by clicking and dragging the displayed icon or window for example. A flyout may be configured to be positioned on a side of the first icon or window that is available for illustration depending on the location of the icon or window on the display.

It should be understood that other displays associated with the application may also be utilized in terminal devices. For example, in the event the user chooses to open the full application so the entire application is loaded and run for currently using or interacting with other features of the application to control the communication terminal device the information provided by the first icon or expandable windows will be provided in another view for a graphical user interface. The icon and windows may be moveable on a display 38a of a device via user input. For instance, any portion of the first icon, first expanded window 38f or second expanded window 38h that does not have other actuatable indicia may be a location on which a user may perform a click and hold action with a mouse to move the icon or a window to adjust the position of the icon or window on the display 38a. It should also be understood that the terminal device may communicate with any number of servers in association with running the application and that the terminal device may also communicate with other network elements or network nodes when executing or running the application.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method of displaying visual data on a display of a terminal device comprising: the terminal device displaying an icon having at least one indicia illustrated thereon such that a portion of the icon partially overlays and covers the at least one indicia on a display of the terminal device so that the at least one indicia is not entirely displayed, the terminal device also having a processor connected to a non-transitory computer readable medium; the terminal device running a first application associated with the icon and illustrating the icon on a foreground of the display of the terminal device such that the icon is on the foreground of the display of the terminal device; the terminal device displaying a window on the display associated with at least one second application that is being run by the terminal device such that the icon is within the foreground of the display of the terminal device; and the terminal device illustrating the portion of the icon overlaying and covering the at least one indicia so that the portion is folded further away from that indicia to further uncover the at least one indicia to provide a more complete view of that indicia in response to receipt of input indicating a pointer is over that indicia.

2. The method of claim 1 further comprising: the terminal device illustrating the portion of the displayed icon folding over a portion of the at least one indicia to partially cover the more complete view of the indicia upon a determination that the pointer is moved away from that indicia.

3. The method of claim 2 wherein the at least one indicia includes expander indicia, the method further comprising: the terminal device displaying a first expanded window to replace the icon upon receipt of input via actuation of the expander indicia of the icon, the first expanded window having presence state indicia, notification indicia, and control indicia illustrated thereon; the terminal device displaying a second expanded window adjacent to the first expanded window upon a determination that input was provided to the terminal device via the first expanded window to further expand the first expanded window, the second expanded window having contact information indicia displayed thereon, the contact information comprising information identifying presence states for different contacts, the information identifying presence states being an image for each contact that identifies at least one of a location and an activity of the contact.

4. The method of claim 1 wherein the at least one indicia includes expander indicia, the method further comprising: the terminal device displaying a first expanded window to replace the icon upon receipt of input via actuation of the expander indicia of the icon, the first expanded window having presence state indicia, notification indicia, and control indicia illustrated thereon; the terminal device displaying a second expanded window to replace the first expanded window upon a determination that input was provided to the terminal device via the first expanded window, the second expanded window having presence state indicia, notification indicia, control indicia, and contact information indicia displayed thereon.

5. The method of claim 1 further comprising: the terminal device displaying communication session advisory indicia adjacent the icon in response to receiving data for establishing a communication session with the terminal device, the communication session advisory indicia comprising information relating to the communication session.

6. The method of claim 5 further comprising: the terminal device displaying actuatable feature indicia adjacent the communication session advisory indicia upon a determination that a pointer is positioned on the display over the communication session advisory indicia, the actuatable feature indicia being actuatable to actuate a feature of the terminal device for communicating with a party seeking to establish the communication session with the terminal device.

7. The method of claim 6 wherein the data for establishing a communication session with the terminal device is data received from a server for establishing a phone call with a telephony enabled device.

8. The method of claim 1, wherein the at least one indicia includes notification indicia, the method further comprising: the terminal device determining a communication error occurred between the terminal device and a server to which the terminal device communicates when running the first application; the terminal device displaying the notification indicia on the icon upon determining that the communication error occurred to provide indicia indicating that the communication error occurred.

9. The method of claim 8 further comprising: the terminal device determining the communication error was resolved; and the terminal device removing the displayed notification indicia from the icon.

10. The method of claim 1 wherein the icon also has at least one function indicia, each of the function indicia associated with a respective function of the terminal device defined by the first application that is actuatable via user input provided to actuate that function indicia, the method comprising: the terminal device determining that one of the function indicia is actuated via input provided to the terminal device; the terminal device performing one of initiating a phone call, initiating an email, and initiating a text message in response to the received input that actuated the one of the function indicia.

11. The method of claim 10 wherein the input provided to the terminal device to actuate the one of the function indicia is pressure applied to the display of the terminal device on a location in which that function indicia is illustrated.

12. The method of claim 10 wherein the input provided to the terminal device to actuate the one of the function indicia is a pointer being moved on the display of the terminal device so the pointer is over a location in which that function indicia is illustrated.

13. The method of claim 1 further comprising: the terminal device receiving multiple communication session related messages from a server and displaying the notification indicia to indicate information about the communication session related messages.

14. The method of claim 1 wherein the at least one indicia includes presence state indicia, the presence state indicia being a graphical representation of a presence state that is predefined to correspond with the presence state identified in the presence state data received from a server.

15. The method of claim 1 further comprising: the terminal device displaying a first expanded window to replace the icon upon receipt of input via actuation of the at least one indicia of the icon, the first expanded window having presence state indicia, notification indicia, and control indicia illustrated thereon; the terminal device replacing the first expanded window with the icon on the display of the terminal device in response to determining that a predetermined amount of time passed without input being provided to the terminal device via the first expanded window, the icon being displayed in the foreground of the display such that the icon is always within the foreground of the display of the terminal device when the first application is being run by the terminal device.

16. A communication apparatus comprising: a first terminal device having a display and a processor connected to a non-transitory computer readable medium, a first application being stored in the non-transitory computer readable medium; the first terminal device configured to display an icon having at least one indicia illustrated thereon on the display of the first terminal device; the first terminal device configured to run the first application associated with the icon and illustrate the icon on a foreground of the display such that the icon is on the foreground of the display of the first terminal device; and the first terminal device configured to illustrate a portion of the icon overlaying and covering the at least one indicia so that the portion is folded further away from that indicia to further uncover the at least one indicia to provide a more complete view of that indicia in response to receipt of input indicating a pointer is over that indicia.

17. The apparatus of claim 16 wherein the first terminal device is configured to illustrate the portion of the displayed icon folding over a portion of the one of the at least one indicia to partially cover the more complete view of the indicia upon a determination that the pointer is moved away from that indicia.

18. The apparatus of claim 17 wherein the pointer is positioned via movement of an input device or movement of a human finger on the display.

19. The apparatus of claim 16 wherein: the first terminal device is configured to display communication session advisory indicia adjacent the icon in response to receiving data for establishing a communication session, the communication session advisory indicia comprising information relating to the communication session; the first terminal device configured to display actuatable feature indicia adjacent the communication session advisory indicia upon a determination that the pointer is positioned on the display over the communication session advisory indicia, the actuatable feature indicia being actuatable to actuate a feature of the first terminal device for establishing the communication session; the first terminal device configured to perform one of initiating a phone call, initiating an email, and initiating a text message in response to the received input that actuated the feature indicia.

* * * * *